United States Patent
Ziegler (10) Patent No.: US 7,131,691 B2
(45) Date of Patent: Nov. 7, 2006

(54) TANDEM SEAT FOR A MOTORCYCLE HAVING A CONCEALABLE BACKREST ASSEMBLY

(76) Inventor: Scott W. Ziegler, 932 Vista del Monte Way, El Cajon, CA (US) 92020

( * ) Notice: Subject to any disclaimer, the term of this patent is extended or adjusted under 35 U.S.C. 154(b) by 124 days.

(21) Appl. No.: 10/600,897

(22) Filed: Jun. 20, 2003

(65) Prior Publication Data

US 2004/0256897 A1 Dec. 23, 2004

(51) Int. Cl.
*B62J 1/00* (2006.01)
(52) U.S. Cl. .............................. 297/215.12; 297/195.12
(58) Field of Classification Search ................ 297/353, 297/378.1, 232, 243, 195.1, 195.11, 195.12, 297/215.1, 215.11, 215.12, 383, 125, 126, 297/378.12; 180/219; 280/304.4
See application file for complete search history.

(56) References Cited

U.S. PATENT DOCUMENTS

| | | | | |
|---|---|---|---|---|
| 584,132 | A * | 6/1897 | Hunzinger | 297/118 |
| 1,380,935 | A * | 6/1921 | Horace | 297/215.12 |
| 2,159,517 | A * | 5/1939 | Beeman | 297/156 |
| 2,483,309 | A * | 9/1949 | Amaducci | 297/54 |
| 2,814,334 | A * | 11/1957 | Lane | 297/125 |
| 3,822,917 | A | 7/1974 | George | 297/195 |
| 3,873,127 | A * | 3/1975 | McNichol et al. | 280/202 |
| 3,887,231 | A | 6/1975 | Bochynsky | 297/366 |
| 3,901,534 | A | 8/1975 | Popken | 280/289 |
| 3,913,974 | A | 10/1975 | Bowen | 297/195 |
| 4,030,750 | A | 6/1977 | Abram | 297/375 |
| 4,313,639 | A | 2/1982 | Ware | 297/366 |
| 4,440,330 | A | 4/1984 | Goodman | 234/30 |
| 4,506,754 | A * | 3/1985 | Hirano et al. | 180/219 |
| 4,570,998 | A | 2/1986 | Hughes | 297/353 |
| 4,679,647 | A | 7/1987 | Komuro | 180/219 |
| 4,953,911 | A | 9/1990 | Hanagan | 297/195 |
| 5,026,119 | A * | 6/1991 | Frank et al. | 297/383 |
| 5,997,088 | A * | 12/1999 | Stark et al. | 297/354.13 |
| 6,059,358 | A * | 5/2000 | Demick et al. | 297/188.04 |
| 6,068,334 | A * | 5/2000 | Bonfilio | 297/215.12 |
| 6,135,473 | A * | 10/2000 | Wright | 280/202 |
| 6,135,558 | A * | 10/2000 | Behrens et al. | 297/353 |
| 6,183,043 | B1 * | 2/2001 | Nelson | 297/201 |
| 6,464,297 | B1 * | 10/2002 | Garrido et al. | 297/354.13 |

FOREIGN PATENT DOCUMENTS

GB 2076754 A * 12/1981

* cited by examiner

*Primary Examiner*—Milton Nelson, Jr.
(74) *Attorney, Agent, or Firm*—Rodney F. Brown (57) ABSTRACT

A motorcycle seating unit includes a seat and a backrest assembly. The seat has a front side and a top seating surface with an essentially horizontal orientation. The backrest assembly has a support arm and a back bar having an external surface. The support arm rotatably engages the seat at one end and engages the back bar at the other end. The backrest assembly has a first selective operational position characterized by an essentially vertical orientation and a second selective operational position characterized by an essentially horizontal orientation. In the second selective operational position, the external surface of the back bar is essentially even with the height of the front side of the seat to expose an essentially smooth continuous transition between the back bar and the seat.

21 Claims, 6 Drawing Sheets

TANDEM SEAT FOR A MOTORCYCLE HAVING A CONCEALABLE BACKREST ASSEMBLY

TECHNICAL FIELD

The present invention relates generally to motorcycle seats, and more particularly to a tandem seat for a motorcycle having a backrest assembly, which can be concealed when not in use.

BACKGROUND OF THE INVENTION

Motorcycles are commonly provided with tandem seats, which enable the motorcycle to carry a passenger in addition to the driver of the motorcycle. It is often desirable to include a backrest at the rear of the tandem seat for both the comfort and safety of the passenger. However, the backrest can be an aesthetic and practical hindrance when the motorcycle is not carrying a passenger. Accordingly, a number of backrests for tandem seats have been developed which fold up when not in use and fold out during use. Representative backrests are disclosed in U.S. Pat. Nos. 4,953,911 and 4,679,647. The present invention recognizes a need for an alternate more effective configuration of a tandem seat for a motorcycle which has a backrest convertible between a fold-up position of nonuse and a fold-out position of use. Accordingly, it is an object of the present invention to provide such a tandem seat for a motorcycle. More particularly, it is an object of the present invention to provide a tandem seat for a motorcycle having a convertible backrest which is concealed when not in use. These objects and others are accomplished in accordance with the invention described hereafter.

SUMMARY OF THE INVENTION

In accordance with one embodiment, the present invention is a motorcycle seating unit comprising a seat and a backrest assembly. The seat includes a seating surface, which has an essentially horizontal orientation, and a front side, which has a height. The essentially horizontal orientation of the seating surface may include an arc to facilitate mounting the seat on an arcuate mounting surface. The backrest assembly includes a support arm and a back bar. The support arm has a pivot end and a free end and the back bar has an external surface, which preferably comprises a front face, a rear face, a top face, and a bottom face. The pivot end of the support arm rotatably engages the seat, while the free end of the support arm engages the back bar, preferably rotatably.

The backrest assembly has a first selective operational position characterized by an essentially vertical orientation, which preferably has an angle of recline in a range from about 0° to 45° beyond true vertical. The backrest assembly also has a second selective operational position characterized by an essentially horizontal orientation. When the backrest assembly is in the second selective operational position, the back bar is positioned adjacent the seating surface. The back bar adjoins the height of the front side of the seat such that the external surface of the back bar is essentially even with the height of the front side. More particularly, the bottom face preferably adjoins the height of the front side such that the rear face is essentially even with the height of the front side where the rear face intersects the bottom face to expose an essentially smooth continuous transition between the back bar and the seat.

The seat of the above-described motorcycle seating unit may be more specifically characterized as including a front side, a rear side opposite the front side, a first lateral side, and a second lateral side opposite the first lateral side. The backrest assembly may be more specifically characterized as including two, rather than one, support arms, i.e., a first lateral support arm, having a first pivot end and a first free end, and a second lateral support arm, having a second pivot end and a second free end. The first and second free ends of the first and second support arms engage the back bar, preferably rotatably engaging first and second ends of the back bar, respectively. The first and second pivot ends of the first and second support arms rotatably engage the seat, preferably at the first and second lateral sides, respectively, proximal the rear side of the seat. The first and second lateral support arms are preferably positioned adjacent the first and second lateral sides, respectively, when the backrest assembly is in the second selective operational position.

In accordance with another embodiment, the present invention is a tandem seat for a motorcycle comprising a driver seat segment, a passenger seat segment and a backrest assembly. The driver seat segment includes a driver seating surface, which has an essentially horizontal orientation, and a rear edge, which has a height. The passenger seat segment and backrest assembly substantially correspond to the seat and backrest assembly described above. When the backrest assembly is in the second selective operational position, the back bar is positioned adjacent the driver seating surface and the passenger seating surface. The back bar adjoins the height of the rear edge of the driver seat segment and the height of the front side of the passenger seat segment. Accordingly, the external surface of the back bar is essentially even with the height of the rear edge of the driver seat segment and the height of the front side of the passenger seat segment. More particularly, the bottom face of the back bar preferably adjoins the height of the front side of the passenger seat segment such that the rear face of the back bar is essentially even with the height of the front side where the rear face intersects the bottom face of the back bar. Furthermore, the top face of the back bar preferably adjoins the height of the rear edge of the driver seat segment such that the rear face is essentially even with the height of the rear edge where the rear face intersects the top face of the back bar. An essentially smooth continuous transition between the driver seat segment and the passenger seat segment is exposed by the present configuration.

In accordance with yet another embodiment, the present invention is a tandem seat for a motorcycle comprising a driver seat segment, a back bar receptacle segment, a passenger seat segment and a backrest assembly. The driver seat segment substantially corresponds to the driver seat segment described above. The back bar receptacle segment includes a first lateral wall, a second lateral wall, a top surface, and a back bar receptacle depressed below the top surface. The back bar has a back bar thickness and the back bar receptacle is preferably depressed to a depth corresponding to the back bar thickness. The boundary of the back bar receptacle comprises the first and second lateral walls, the rear edge of the driver seat segment, and the front side of the passenger seat segment. The passenger seat segment includes a support arm receptacle depressed below the passenger seating surface. The support arm has a support arm thickness and the support arm receptacle is preferably depressed to a depth corresponding to the support arm thickness. The backrest assembly includes a single support arm and the back bar, both of which have external surfaces. The support arm preferably centrally engages the back bar.

When the backrest assembly is in the second selective operational position, the back bar is positioned in the back bar receptacle such that the back bar external surface is essentially even with the top surface of the back bar receptacle segment. The support arm is positioned in the support arm receptacle such that the support arm external surface is essentially even with the passenger seating surface. An essentially smooth continuous transition between the driver seat segment and the passenger seat segment is exposed by the present configuration.

The present invention will be further understood from the drawings and the following detailed description.

DESCRIPTION OF PREFERRED EMBODIMENTS

Figure 1:
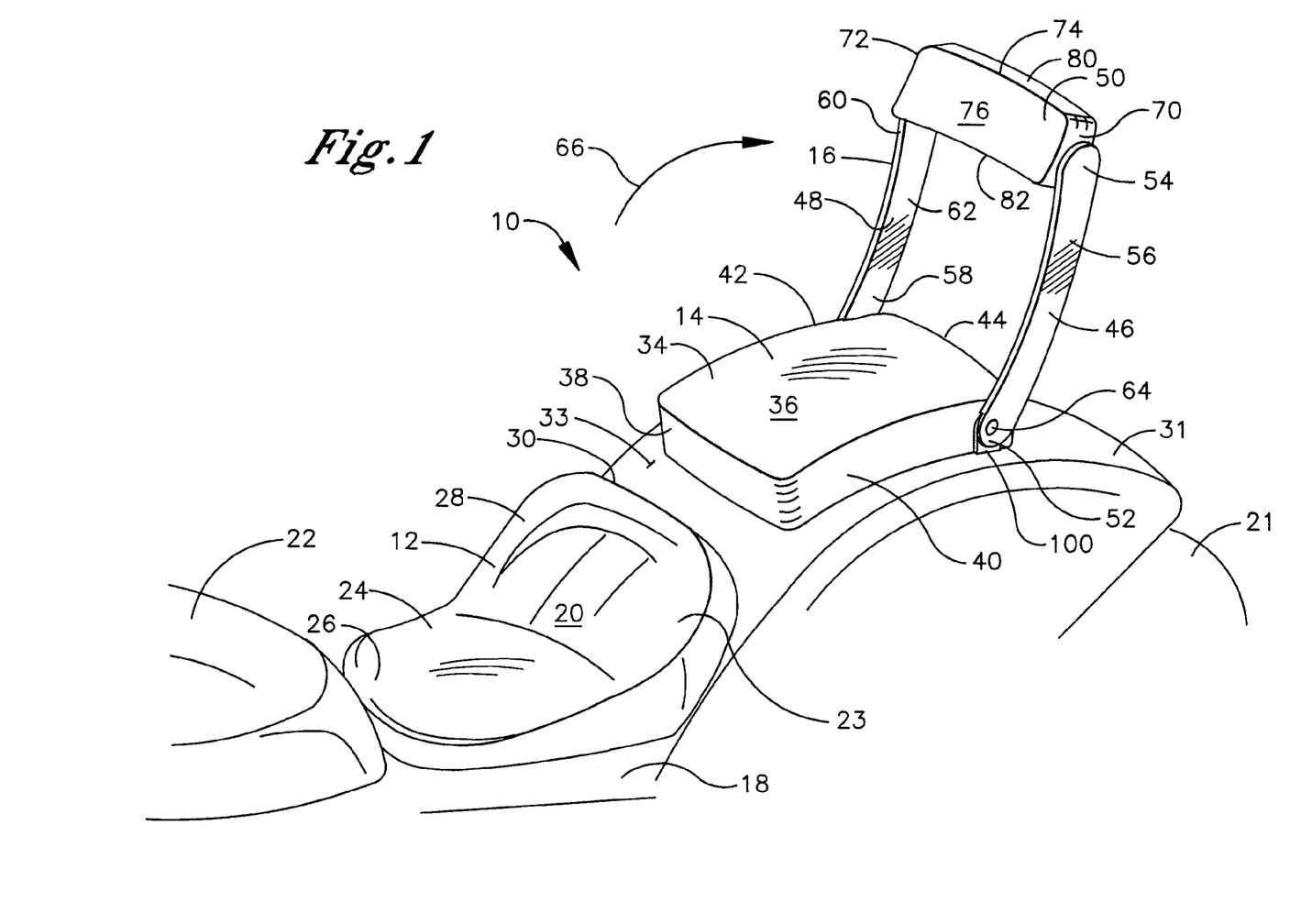
FIG. 1 is a perspective view of an embodiment of a tandem seat of the present invention mounted on a motorcycle, wherein the seat has a backrest assembly shown in a fold-out position of use.
Figure 2:
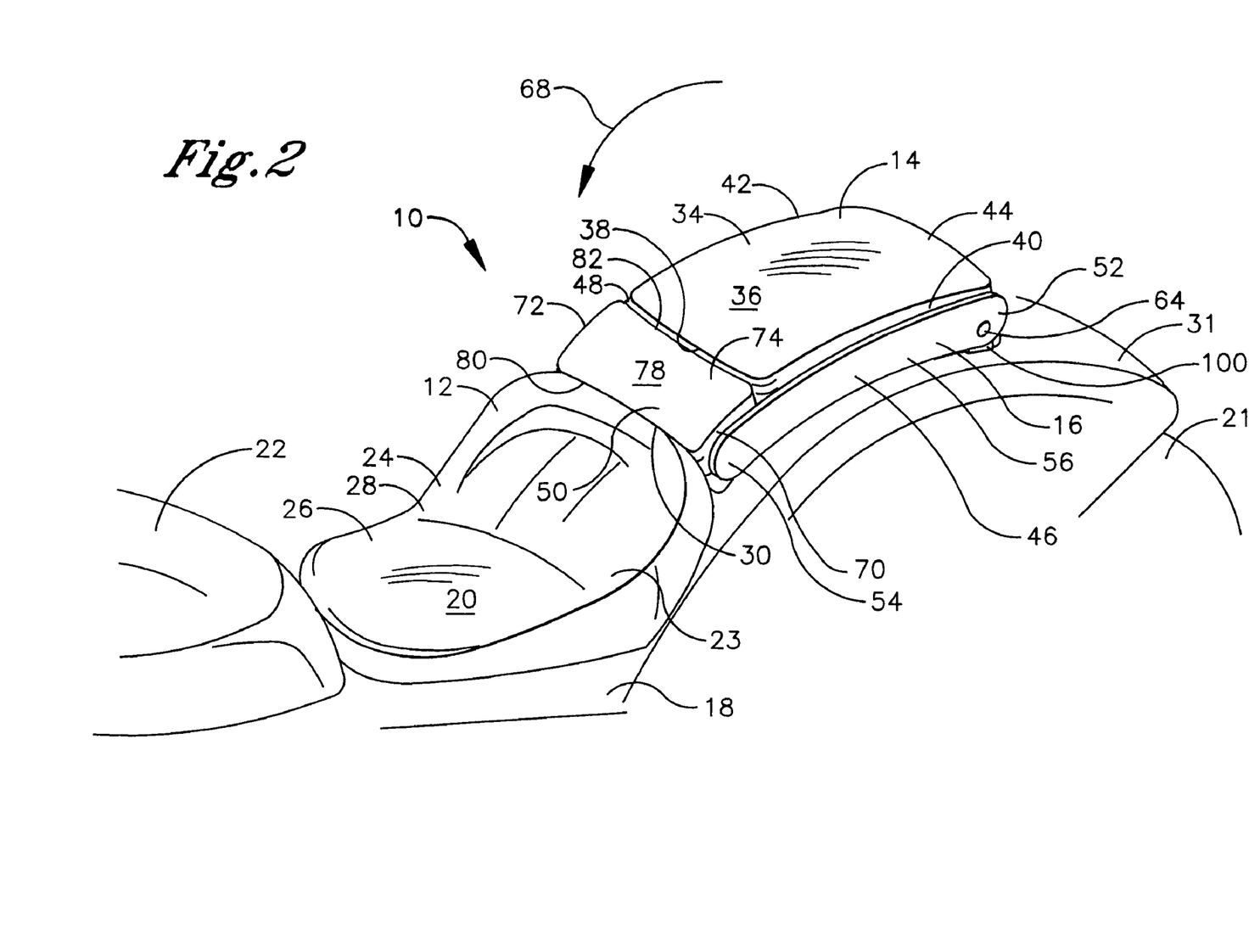
FIG. 2 is a perspective view of the tandem seat of FIG. 1, wherein the backrest assembly is in a fold-up position of nonuse.

Referring to FIGS. 1 and 2, an embodiment of a tandem seat for a motorcycle is shown and generally designated 10. The tandem seat 10 is an accessory preferably applicable to a class of motorcycles termed "road bikes", which are relatively large and powerful motorcycles designed for highway riding and capable of comfortably carrying one or two full-size adult persons, either a driver or alternatively a driver and a passenger, if desired. Road bikes are produced by a number of motorcycle manufacturers including Harley-Davidson and Kawasaki.

The tandem seat 10 of the present invention comprises a forward driver seat segment 12, a rearward passenger seat segment 14 and a concealable backrest assembly 16. The driver seat segment 12 is fixably mounted atop the motorcycle chassis 18 by conventional mounting means, which, for example, includes suitable hardware, such as fasteners, mounting brackets and the like. The driver seat segment 12 has a driver seating surface 20 which is preferably sized for a full-size adult to sit in weight-bearing engagement thereon as a driver of the motorcycle, thereby avoiding substantial weight-bearing engagement with the motorcycle chassis 18. The driver seat segment 12 is preferably positioned relative to the other components of the motorcycle such that the driver seated thereon has an unimpeded view of the route in front of the motorcycle and has unimpeded physical access to the driving controls of the motorcycle, thereby enabling the seated driver to effectively operate the motorcycle. The driver seat segment 12 is generally positioned between the front wheel (not shown) and the rear wheel 21 of the motorcycle and is often more particularly positioned over the engine (not shown) immediately behind or partially over the gas tank 22, which resides behind the forward mounted handlebars (not shown) of the motorcycle.

The driver seat segment 12 preferably has a conventional saddle construction which includes, for example, a frame (not shown) and an upholstery 23 enclosing the frame. The frame is preferably formed from a high-strength rigid or semi-rigid material, such as a metal or plastic, which defines the essentially fixed shape of the driver seat segment 12 and provides the primary structural support for the driver seating surface 20. The upholstery 23 is preferably formed from an internal padding (not shown) and an external covering 24, which is fitted over and sewn to the internal padding, commonly in one of any number of quilted patterns. The internal padding is typically a compressible pliant cushioning material such as a foam and the external covering 24 is typically a pliant, yet wear-resistant and weather-resistant material, such as leather, fabric or vinyl, which contacts the driver at the driver seating surface 20.

The driver seating surface 20 is preferably shaped in correspondence with the anatomical contours of the seated driver's thighs and buttocks in the same manner as a saddle. As such, the driver seating surface 20 has a tapered front section 26, which is a horn straddled by the forward extending thighs of the seated driver, and a broadened rear section 28, which is a contoured platform for the buttocks of the seated driver in weight-bearing engagement with substantially all or most of the weight of the seated driver. The rear section 28 is raised upward in the direction of its rear edge 30 to restrict the seated driver from sliding backward on the driver seating surface 20 over the rear edge 30 thereof. It is understood that the driver seat segment of the invention is not limited to the present specific configuration, which is shown by way of example merely for purposes of illustration. It is apparent to the skilled artisan that substantial variation is permitted in the configuration of the driver seat segment within the scope of the present invention.

The passenger seat segment 14 is likewise mounted atop the motorcycle chassis 18 by conventional mounting means to accommodate a motorcycle passenger seated behind the driver. As such, the passenger seat segment 14 is positioned behind the driver seat segment 12 and in most cases is more specifically positioned and mounted atop the rear wheel cover 31, which is a component of the chassis 18 positioned over the rear wheel 21 of the motorcycle. In the present embodiment, the passenger seat segment 14 is spaced a distance apart from the driver seat segment 12 to provide a gap 33 of up to several inches between the driver seat segment 12 and the passenger seat segment 14 along the length of the motorcycle chassis 18. Like the driver seat segment 12, the passenger seat segment 14 has a construction which preferably includes a frame (not shown) and an upholstery 34 enclosing the frame. The frame and upholstery 34 are preferably constructed from identical or similar materials to those of the frame and upholstery 23 of the driver seat segment 12.

The passenger seat segment 14 has an essentially rectangular box configuration having a plurality of surfaces, which define a top side 36, a front side 38, first and second lateral sides 40, 42, and a rear side 44 of the passenger seat segment 14. The bottom side (not shown) which abuts the motorcycle chassis 18 may be open or may be an enclosed surface in the manner of the other sides. Although the sides 38, 40, 42, 44 are shown as being at right angles to one another and essentially planar, it is understood that the passenger seat segment of the invention is not limited to the present particular rectangular box configuration, which is shown by way of example merely for purposes of illustration. It is apparent to the skilled artisan that substantial deviation is permitted in the planarity of the sides and their angular relation to one another within the scope of the present invention. In any case, the top side 36 is a passenger seating surface which is preferably sized to enable a person up to a full-size adult to sit thereon. As such, the passenger seating surface 36 is sized to be in weight-bearing engagement with substantially all or most of the weight of the seated passenger so that the seated passenger does not come into substantial weight-bearing engagement with the motorcycle chassis 18.

Although the passenger seating surface 36 may be anatomically contoured in correspondence with the seated passenger, the passenger seating surface 36 is more typically relatively uniformly configured. In particular, the passenger seating surface 36 is relatively level, having only a slight arc as shown which corresponds to the arc of the underlying rear wheel cover 31. As such, the passenger seating surface 36 has an essentially horizontal orientation. The essentially horizontal orientation of the passenger seating surface 36 includes true horizontal (i.e., precisely 90° from vertical) as well as minor deviations from true horizontal in either direction attributable to variations in the contour of the underlying motorcycle chassis 18 or other design factors. In any case, the configuration of the passenger seating surface 36 enables the thighs of the seated passenger to straddle the passenger seat segment 14 and engage the first and second lateral sides 40, 42 thereof. The passenger seating surface 36 provides a platform for the buttocks of the seated passenger such that the passenger seating surface 36 is in weight-bearing engagement with a substantial portion of the weight of the seated passenger.

The concealable backrest assembly 16 comprises a first lateral support arm 46, a second lateral support arm 48 and a back bar 50. The first lateral support arm 46 and second lateral support arm 48 are substantially identically configured as elongated planar members constructed from a relatively high-strength rigid material such as steel or the like. As such, the first lateral support arm 46 has an anchored first pivot end 52, an opposite displaceable first free end 54, and a first body 56 extending between the first pivot end 52 and the first free end 54. The second lateral support arm 48 similarly has an anchored second pivot end 58, an opposite displaceable second free end 60, and a second body 62 extending between the second pivot end 58 and the second free end 60. The first pivot end 52 rotatably engages the passenger seat segment 14 by means of a first rotational fastener 64 positioned at the first lateral side 40 proximal to its intersection with the rear side 44. The second pivot end 58 similarly rotatably engages the passenger seat segment 14 by means of a second rotational fastener (shown and described below with reference to FIG. 5) positioned at the second lateral side 42 proximal to its intersection with the rear side 44.

The first rotational fastener 64 anchors the first pivot end 52 to the passenger seat segment 14, while enabling a limited range of rotational displacement of the first free end 54 and correspondingly the first body 56 about the first pivot end 52 relative to the passenger seat segment 14, as shown by a clockwise directional arrow 66 in FIG. 1 and a counterclockwise directional arrow 68 in FIG. 2. The second rotational fastener similarly anchors the second pivot end 58 to the passenger seat segment 14, while enabling a limited range of rotational displacement of the second free end 60 and correspondingly the second body 62 about the second pivot end 58 relative to the passenger seat segment 14 in accordance with the clockwise and counterclockwise directional arrows 66, 68.

The back bar 50 extends between the first and second free ends 54, 60 of the first and second lateral support arms 46, 48, respectively, in an essentially perpendicular orientation relative to the first and second lateral support arms 46, 48. The back bar 50 has a first end 70 which is in attachment with the first free end 54 and an opposite second end 72 which is in attachment with the second free end 60. The length of the back bar 50 (i.e., the distance from the first end 70 to the opposite second end 72), and correspondingly the distance between the first and second free ends 54, 60, is about equal to the width of the passenger seat segment 14. Although the back bar 50 may be fixably attached to the first and second free ends 54, 60 by welding, fasteners, or other conventional means, the back bar 50 is preferably rotatably attached to the first and second free ends 54, 60 by rotational fasteners (not shown) which are similar to the first rotational fastener 64 and the second rotational fastener. Rotatable attachment of the back bar 50 to the first and second lateral support arms 46, 48 enables the back bar 50 to rotate in correspondence with the orientation of the back of a passenger resting against the back bar 50 during use as described hereafter.

The back bar 50 is preferably constructed in a substantially similar manner to the driver and passenger seat segments 12 and 14, respectively. As such, the back bar 50 preferably includes a body (not shown) and an upholstery 74 enclosing the body. The body is preferably formed from the same or a similar high-strength rigid material as the first and second lateral support arms 46, 48 and provides the primary structural support for the upholstery 74. The body has an essentially straight planar or rod configuration which defines the essentially fixed shape of the back bar 50. The upholstery 74 is preferably constructed in an identical or similar manner, and from identical or similar materials, to those of the upholstery 23, 34 of the driver and passenger seat segments 12, 14. Although not shown, it is further within the scope of the present invention to enclose the first and second lateral support arms 46, 48 within an upholstery similar to the manner in which the upholstery 74 encloses the body of the back bar 50 for purposes of aesthetics and/or the comfort of a passenger.

The back bar 50 is configured to have a back-supporting front face 76, an opposite rear face 78, a top face 80 and an opposite bottom face 82. In the present embodiment, rotatable attachment of the back bar 50 to the first and second lateral support arms 46, 48 is specifically effected by rotatably attaching the body of the back bar 50 to the first and second free ends 54, 60, while the upholstery 74 of the back bar 50 fixably engages the body of the back bar 50, but not the first and second lateral support arms 46, 48.

The selective operational positions of the backrest assembly 16 relative to the essentially fixed operational positions of the driver and passenger seat segments 12, 14, respectively, are described below with continuing reference to FIGS. 1 and 2. Referring initially to FIG. 1, the backrest assembly 16 is shown in a first selective operational position termed the "fold-out position", wherein the first free end 54 and correspondingly the first body 56 and the back bar 50 have been rotationally displaced backward about the first pivot end 52 in the clockwise direction of the arrow 66 until the first free end 54, first body 56 and back bar 50 have reached the clockwise upper terminus of rotation. The second free end 60 and correspondingly the second body 62 and the back bar 50 have similarly been rotationally displaced backward about the second pivot end 58 in the clockwise direction of the arrow 66 to the clockwise upper terminus of rotation.

When the first and second lateral support arms 46, 48 and back bar 50 are at the clockwise upper terminus of rotation (i.e., when the backrest assembly 16 is in the fold-out position), the first and second lateral support arms 46, 48 are essentially parallel to one another and in an essentially vertical orientation, i.e., essentially perpendicular to the ground on which the motorcycle is standing. In contrast, the back bar 50 is essentially perpendicular to the first and second lateral support arms 46, 48 and in an essentially horizontal orientation, i.e., essentially parallel to the ground. The essentially vertical orientation of the first and second lateral support arms 46, 48 includes true vertical (i.e., precisely 90° from horizontal) as well as minor deviations from true vertical in either direction. For example, in accordance with one embodiment, the essentially vertically-oriented first and second lateral support arms 46, 48 are positioned at an angle of recline, which is between about 0° and 45°, and preferably between about 5° and 30°, beyond true vertical in a clockwise direction. In any case, the backrest assembly 16 is provided with a backward rotation stop (shown and described with reference to FIG. 5) to prevent clockwise backward rotation of the backrest assembly 16 beyond the clockwise upper terminus of rotation.

While the operational positions of the backrest assembly 16 are selective from among a plurality of operational positions including the above-described fold-out position, the operational position of the driver seat segment 12 and the operational position of the passenger seat segment 14 are each preferably essentially permanently fixed. In particular, the fixed operational positions of the driver seat segment 12 and the passenger seat segment 14 are each located atop the motorcycle chassis 18 as described above. The fixed operational positions of the driver seat segment 12 and passenger seat segment 14 are such that both the driver seating surface 12 and passenger seating surface 36 are in an essentially horizontal orientation. The horizontal orientation provides a driver and a passenger, respectively, with fixed, relatively safe and comfortable seats on the motorcycle.

The fold-out position of the backrest assembly 16 is termed a position of use insofar as the backrest assembly 16 supplements the function of the passenger seat segment 14 when the backrest assembly 16 is in the fold-out position. In particular, the folded out backrest assembly 16 provides both a passenger back support and a passenger safety restraint for a passenger seated on the passenger seat segment 14. More particularly, the front face 76 of the back bar 50 provides a comfortable padded support surface which the seated passenger is able to recline against for back support when the backrest assembly 16 is in the fold-out position. Furthermore, the folded out backrest assembly 16 prevents the passenger from sliding off the back of the passenger seat segment 14 during operation of the motorcycle. Although the gap 33 exists between the driver and passenger seat segments 12, 14 when the backrest assembly 16 is in the fold-out position, the driver and passenger seat segments 12, 14 are sufficiently near one another despite the gap 33 to enable a passenger seated on the passenger seat segment 14 to comfortably clutch a driver around the waist or torso who is seated on the driver seat segment 12 in front of the passenger for the stability and safety of the passenger during operation of the motorcycle.

Referring now to FIG. 2, the backrest assembly 16 is shown in a second selective operational position termed the "fold-up position", wherein the first free end 54 and correspondingly the first body 56 and the back bar 50 have been rotationally displaced forward about the first pivot end 52 in the counterclockwise direction of the arrow 68 until the first free end 54, first body 56 and back bar 50 have reached the counterclockwise lower terminus of rotation. The second free end 60 and correspondingly the second body 62 and the back bar 50 have similarly been rotationally displaced forward about the second pivot end 58 in the counterclockwise direction of the arrow 68 to the counterclockwise lower terminus of rotation.

When the first and second lateral support arms 46, 48 and back bar 50 are at the counterclockwise lower terminus of rotation (i.e., when the backrest assembly 16 is in the fold-up position), the first and second lateral support arms 46, 48 remain essentially parallel to one another and essentially perpendicular to the back bar 50. However, the first and second lateral support arms 46, 48 and back bar 50 are all in an essentially horizontal orientation. The first lateral support arm 46 is aligned with and positioned adjacent to the first lateral side 40 of the passenger seat segment 14 to substantially conceal the first lateral side 40, while the outside face of the first lateral support arm 46 remains exposed. The second lateral support arm 48 is similarly aligned with and positioned adjacent to the second lateral side 42 of the passenger seat segment 14 to substantially conceal the second lateral side 42, while the outside face of the second lateral support arm 48 remains exposed. Although not shown, ornamentation such as artwork, including motorcycle insignias, logos or the like, may be affixed to or otherwise positioned on the outside faces of the first and second lateral support arms 46, 48 to enhance the visual effect of the backrest assembly 16 without interfering with operation of the backrest assembly 16. Alternatively, the first and second lateral support arms 46, 48 can be enclosed with an upholstery (not shown) in substantially the same manner as the upholstery 74 enclosing the body of the back bar 50. The upholstery further cushions the back of a seated passenger reclining against the backrest assembly 16 in the fold-out position without interfering with operation of the backrest assembly 16.

The back bar 50 is positioned in the gap 33 between the driver and passenger seat segments 12, 14 with the front face 76 of the back bar 50 engaging the portion of the motorcycle chassis 18 lying beneath the gap 33. The gap 33 is preferably dimensioned in correspondence with the back bar 50 so that the back bar 50 essentially fills the gap 33 and conceals the portion of the motorcycle chassis 18 underlying the gap 33 when the backrest assembly 16 is in the fold-up position. The top face 80 of the back bar 50 aligns with and is positioned adjacent to the rear edge 30 of the rear section 28 of the driver seat segment 12 to substantially conceal the rear edge 30, while the bottom face 82 of the back bar 50 aligns with and is positioned adjacent to the front side 38 of the passenger seat segment 14 to substantially conceal the front side 38. The thickness of the top face 80 of the back bar 50 preferably corresponds to the height of the rear edge 30 of the rear section 28 of the driver seat segment 12, while the thickness of the bottom face 82 of the back bar 50 preferably corresponds to the height of the front side of the passenger seat segment 14. Accordingly, the back bar 50 provides an essentially smooth even transition from the driver seat segment 12 to the passenger seat segment 14. As such, the driver seat segment 12, backrest assembly 16, and passenger seat segment 14 appear to the observer as a single integrated structure and the driver seating surface 20, the exposed rear face 78 of the back bar 50, and the passenger seating surface 36 appear to the observer as an essentially single continuous smooth even surface.

The fold-up position of the backrest assembly 16 is termed a position of nonuse insofar as the backrest assembly 16 is essentially non-functional in the fold-up position. The backrest assembly 16 is preferably maintained in a fold-up position when the motorcycle is only carrying a driver without a passenger. In the absence of a passenger, there is generally no beneficial purpose for maintaining the backrest assembly 16 in the fold-out position so the backrest assembly 16 is advantageously concealed in the fold-up position. Concealment of the backrest assembly 16 is both aesthetically and functionally advantageous. As recited above, the profile of the tandem seat 10 has a clean continuous appearance when the backrest assembly 16 is concealed. In addition, the backrest assembly 16 does not create drag or otherwise impede use of the motorcycle when concealed.

The backrest assembly 16 is readily transitioned from the fold-up position of nonuse to the fold-out position of use. The user simply manually grasps the back bar 50 while in the gap 33 and lifts the back bar 50 out of the gap 33, which rotates the back bar 50 and the first and second free ends 54, 60 and first and second bodies 56, 62 of the first and second lateral support arms 46, 48 about the first and second pivot ends 52, 58, respectively, in the clockwise direction of the arrow 66. Rotational displacement is terminated (preferably by the backward rotation stop shown in FIG. 5) at the clockwise upper terminus of rotation when the predetermined angle of recline is reached. Conversely, the backrest assembly 16 is readily transitioned from the fold-out position of use to the fold-up position of nonuse. The user manually grasps the back bar 50 and pulls on the back bar 50 to rotate the back bar 50 and the first and second free ends 54, 60 and first and second bodies 56, 62 of the first and second lateral support arms 46, 48 about the first and second pivot ends 52, 58, respectively, in the counterclockwise direction of the arrow 68. Rotational displacement is terminated at the counterclockwise lower terminus of rotation when the back bar 50 is pushed into and fills the gap 33. A separate forward rotation stop is preferably not required at the counterclockwise lower terminus of rotation because engagement of the back bar 50 with the motorcycle chassis 18 performs this function. Although not shown, a conventional releasable lock may be provided, which enables the user to releasably lock the backrest assembly 16 in the fold-up and/or fold-out position.

FIGS. 1 and 2 show the driver and passenger seat segments 12, 14 as being structurally separate elements. The relative positions of the driver and passenger seat segments 12, 14 are determined by the practitioner mounting the driver and passenger seat segments 12, 14 on the motorcycle chassis 18. In accordance with one embodiment, the driver seat segment 12 is a stock accessory mounted on the chassis 18 by the original manufacturer of the motorcycle. The passenger seat segment 14 and associated backrest assembly 16 are aftermarket accessories, which are generally preassembled by the aftermarket manufacturer as a single integrated seating unit 14, 16 and mounted on the chassis 18 after original manufacture of the motorcycle by a user or someone other than the original manufacturer of the motorcycle. A number of different models of integrated seating units 14, 16 can be made available in the aftermarket, each of which dimensionally and/or ornamentally conforms to a specific motorcycle model and/or driver seat segment model.

Figure 3:
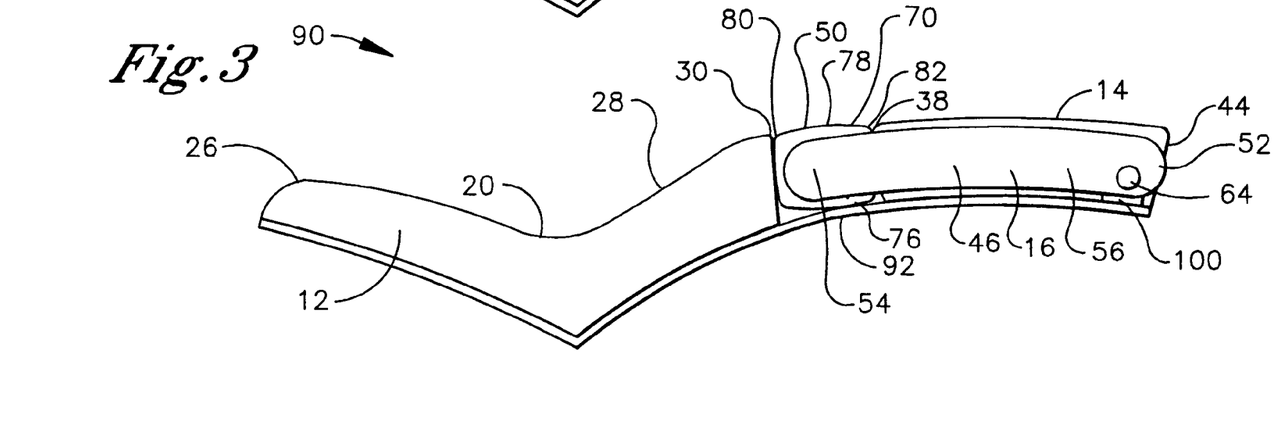
FIG. 3 is a perspective view of an alternate embodiment of a tandem seat of the present invention mounted on a motorcycle, wherein the seat has a backrest assembly shown in a fold-out position of use.
Figure 4:
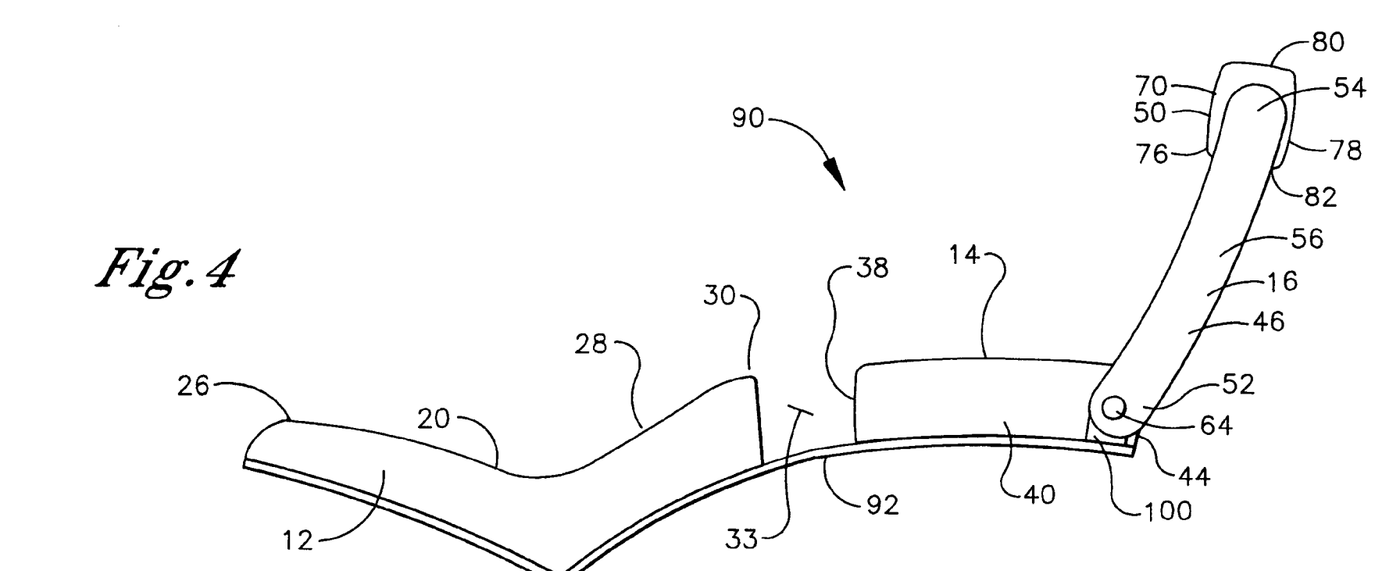
FIG. 4 is a perspective view of the tandem seat of FIG. 3, wherein the backrest assembly is in a fold-up position of nonuse.

Referring to FIGS. 3 and 4, an alternate embodiment of a tandem seat for a motorcycle is shown and generally designated 90. The tandem seat 90 is substantially similar to the tandem seat 10 described above and shown in FIGS. 1 and 2. Therefore, components shown in FIGS. 3 and 4 which are common to FIGS. 1 and 2 are identified by the same reference characters. However, unlike the tandem seat 10, the tandem seat 90 further comprises a mounting plate 92, on which the driver seat segment 12 and the passenger seat segment 14 and associated backrest assembly 16 are commonly mounted by means within the purview of the skilled artisan.

The tandem seat 90 is mounted to the motorcycle by fixably attaching the mounting plate 92 to the motorcycle chassis 18 so that the positions of the driver seat segment 12, passenger seat segment 14 and backrest assembly 16 with respect to the motorcycle correspond to the relative positions of the tandem seat 10 with respect to the motorcycle. Thus, the driver seat segment 12, passenger seat segment 14, backrest assembly 16 and mounting plate 92 of the present embodiment comprise a single unified accessory 90 which is either a stock accessory installed by the original manufacturer of the motorcycle or an aftermarket accessory which is mounted on the motorcycle after original manufacture of the motorcycle by a user or someone other than the original manufacturer of the motorcycle. A number of different models of unified accessories 90 can be made available in the original market or aftermarket, each of which dimensionally and/or ornamentally conforms to a specific motorcycle model.

Figure 5:
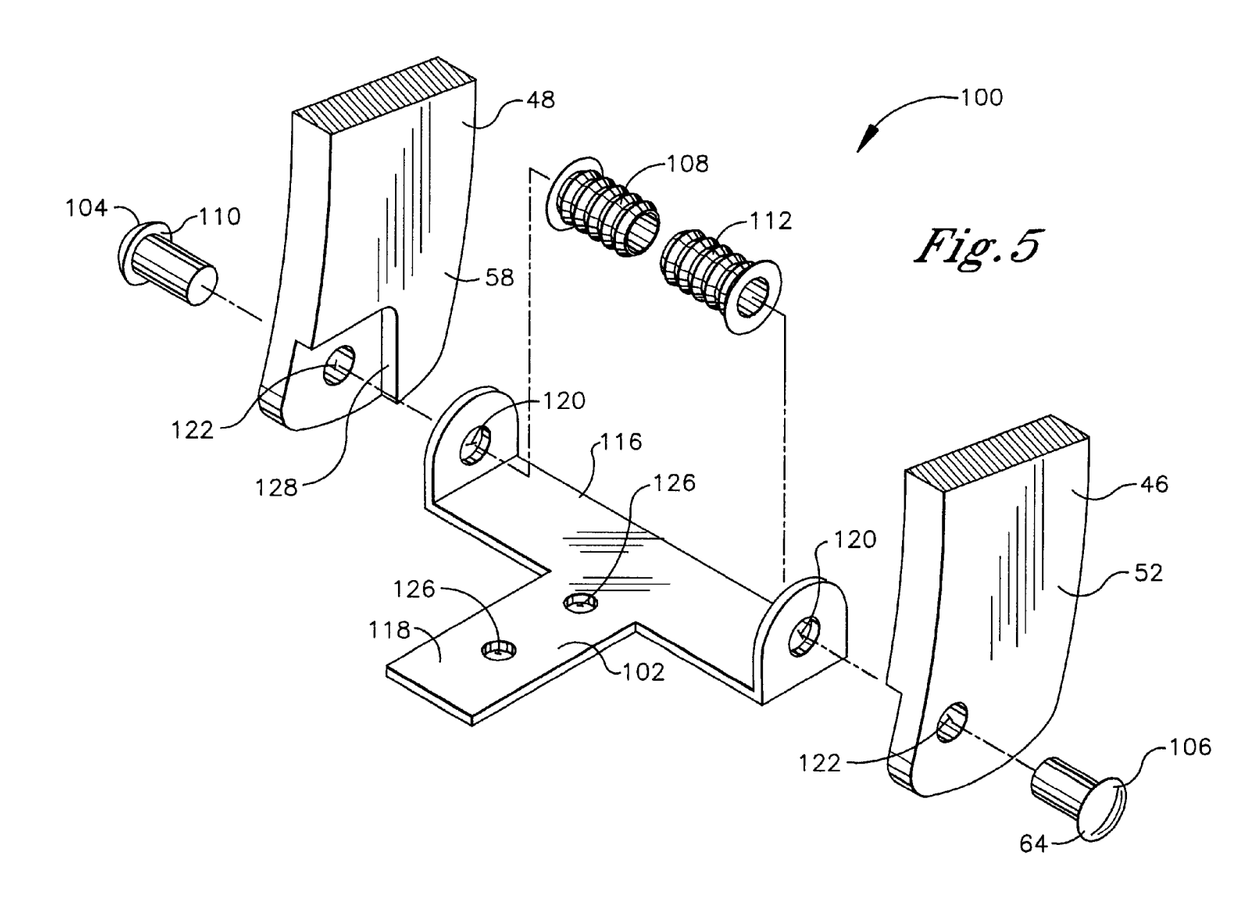
FIG. 5 is an exploded perspective view of an embodiment of a pivot means for the backrest assembly of the tandem seat of FIGS. 1 and 2 or the tandem seat of FIGS. 3 and 4.

Referring to FIG. 5, an embodiment of a pivot means for the backrest assembly 16 of the tandem seat 10 or 90 is shown and generally designated 100 (also shown in part in FIGS. 1–4). Components shown in FIG. 5 which are common to FIGS. 1–4 are identified by the same reference characters. The pivot means 100 is a structural component of the passenger seat segment 14 which comprises a mounting bracket 102, the first rotational fastener 64 and the second rotational fastener 104. The first rotational fastener 64 comprises a first male pivot pin 106 and a first female retention member 108. The second rotational fastener 104 comprises a second male pivot pin 110 and a second female retention member 112. The mounting bracket 102 has a "T" configuration with a cross-member 116 and a central member 118.

The mounting bracket 102 is sized to nest within the interior of the passenger seat segment 14, the exterior of which has been deleted from FIG. 5 for clarity. In practice, only the ends of the cross-member 116, which are positioned proximal the rear side 44 of the passenger seat segment 14, are exposed from the interior of the passenger seat segment 14 for rotational engagement with the first and second pivot ends 52, 58 of the first and second lateral support arms 46, 48 in a manner described below. Pivot apertures 120 are provided in opposite ends of the cross-member 116 which are aligned with corresponding pivot apertures 122 in the first and second pivot ends 52, 58 of the first and second lateral support arms 46, 48, respectively, and pivot apertures (not shown) in the first and second lateral sides 40, 42, respectively, of the passenger seat segment 14 proximal the rear side 44. Mounting apertures 126 are also provided in the central member 118 which are aligned with corresponding mounting apertures (not shown) in the motorcycle chassis 18 in the case of the tandem seat 10 or with corresponding mounting apertures (not shown) in the mounting plate 92 in the case of the tandem seat 90.

The first and second pivot ends 52, 58 of the first and second lateral support arms 46, 48, respectively, rotatably engage the passenger seat segment 14 by inserting the male ends of the first and second pivot pins 106, 110 through the pivot apertures 122 of the first and second pivot ends 52, 58, the pivot apertures of the first and second lateral sides 40, 42 and the pivot apertures 120 of the cross-member 116, respectively. The male ends of the first and second pivot pins 106 are then inserted into the first and second female retention members 108, 112 and retained therein by press fitting or crimping so that the first and second lateral support arms 46, 48 are free to rotate about the first and second pivot pins 106, 110, respectively, but are retained in rotatable engagement with the passenger seat segment 14 by the first and second pivot pins 106, 110 and the first and second female retention members 108, 112. The first and second pivot ends 52, 58 are further provided with backward rotation stops 128 to prevent clockwise backward rotation of the backrest assembly 16 beyond the clockwise upper terminus of rotation. The mounting apertures 126 and corresponding mounting apertures in the motorcycle chassis 18 or in the mounting plate 92 also enable fixable attachment of the mounting bracket 102 to the motorcycle chassis 18 or to the mounting plate 92 in the case of the tandem seat 10 or 90, respectively, in a manner within the purview of the skilled artisan.

It is understood that the pivot means of the invention is not limited to the present embodiment, which is shown by way of example merely for purposes of illustration. It is apparent to the skilled artisan that other pivot means are possible within the scope of the present invention. For example, the first and second pivot pins can be rivets or the first and second pivot pins can be externally threaded bolts and the first and second female retention members can be internally threaded nuts. Alternatively, the first and second pivot pins can be replaced by a single rod, which is suitably rotatably fastenable to the passenger seat segment 14.

Figure 6:
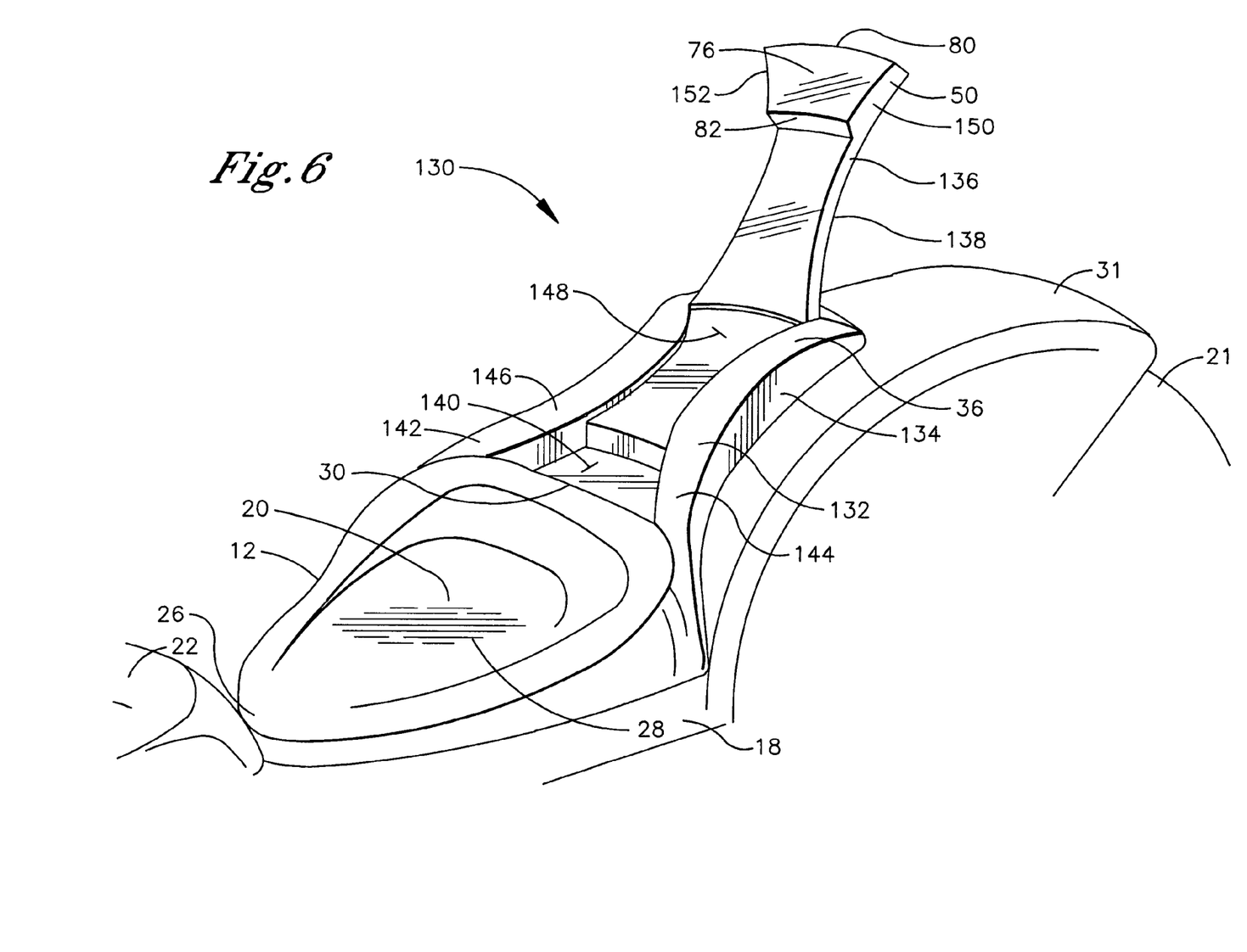
FIG. 6 is a perspective view of another alternate embodiment of a tandem seat of the present invention mounted on a motorcycle, wherein the seat has a backrest assembly shown in a fold-out position of use.
Figure 7:
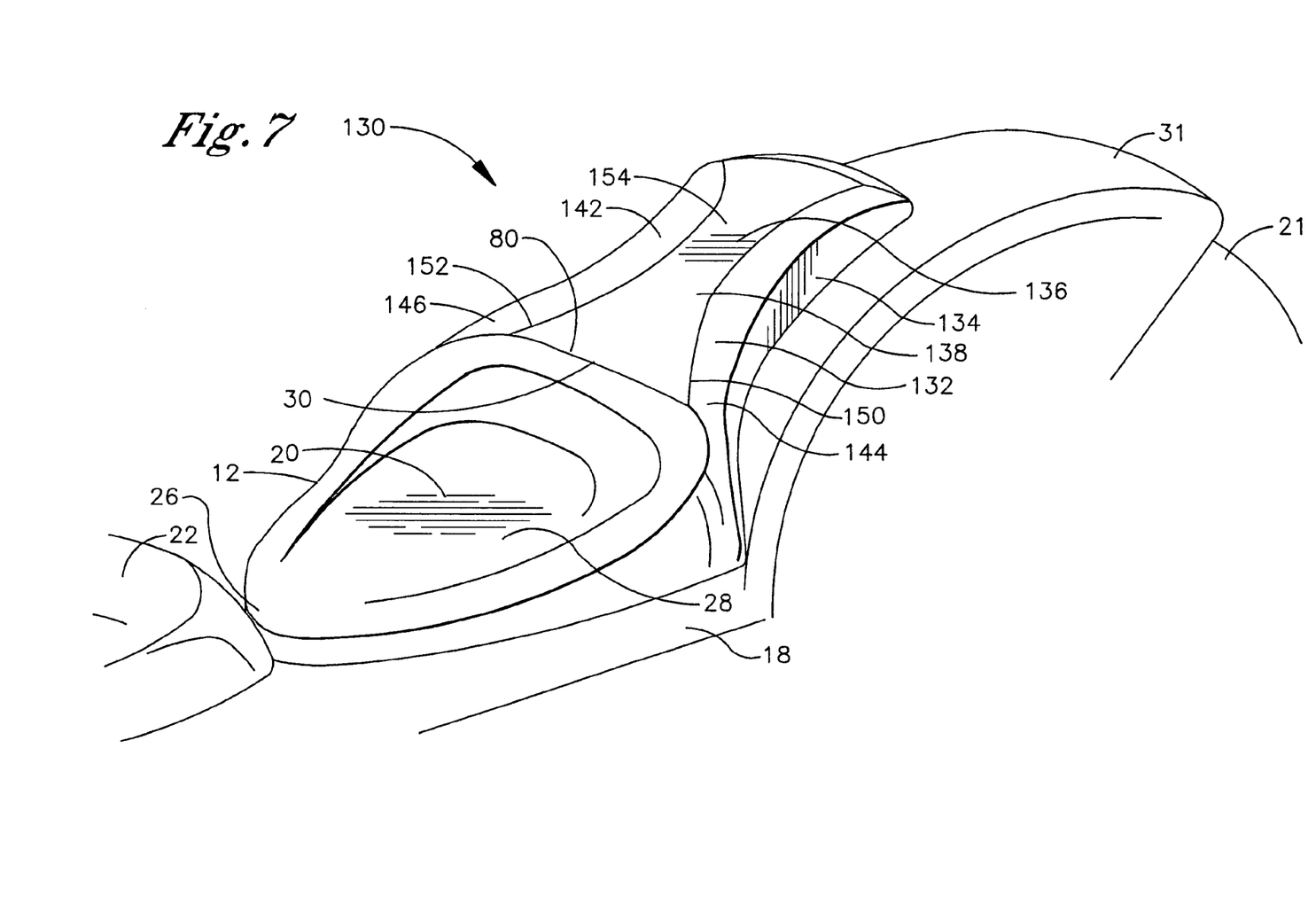
FIG. 7 is a perspective view of the tandem seat of FIG. 6, wherein the backrest assembly is in a fold-up position of nonuse.

Referring to FIGS. 6 and 7, an alternate embodiment of a tandem seat for a motorcycle is shown and generally designated 130. The tandem seat 130 is similar to the tandem seats 10 and 90 described above and shown in FIGS. 1–5. Therefore, components shown in FIGS. 6 and 7 which are common to FIGS. 1–5 are identified by the same reference characters. The tandem seat 130 comprises in series the driver seat segment 12, a back bar receptacle segment 132, and a passenger seat segment 134, which are constructed as a single contiguous integral structure. Unlike the backrest assembly 16 of the tandem seats 10, 90, which has the first and second lateral support arms 46, 48 engaging the back bar 50, the tandem seat 130 has a backrest assembly 136 having a single support arm 138 centrally engaging the back bar 50.

The back bar receptacle segment 132 includes a depressed back bar receptacle 140 formed in the top surface 142 of the back bar receptacle segment 132. The back bar receptacle 140 is bounded by opposite first and second lateral walls 144, 146 of the back bar receptacle segment 132, the rear edge 30 of the driver seat segment 12 and the front side 38 of the passenger seat segment 134. The back bar receptacle 140 is configured and dimensioned in correspondence with the back bar 50 so that the back bar receptacle 140 receives and is essentially filled by the back bar 50 when the backrest assembly 136 is in the fold-up position described below. The passenger seat segment 134 similarly has a depressed support arm receptacle 148 formed in the top side 36 which is configured and dimensioned in correspondence with the support arm 138 so that the support arm receptacle 148 receives and is essentially filled by the support arm 138 when the backrest assembly 136 is in the fold-up position.

The driver and passenger seat segments 12, 134 of the tandem seat 130 have the same fixed operational positions as the corresponding elements of the tandem seats 10, 90. The backrest assembly 136 of the tandem seat 130 is similarly transitionable between a first operational fold-out position of use and a second operational fold-up position of nonuse by rotating the support arm 138 about a pivot means (not shown) rotatably engaging the support arm 138 and the passenger seat segment 134. When the backrest assembly 136 is in the fold-up position, the top face 80 of the back bar 50 aligns with and is positioned adjacent to the rear edge 30 of the rear section 28 of the driver seat segment 12, the bottom face 82 of the back bar 50 aligns with and is positioned adjacent to the front side 38 of the passenger seat segment 134, and opposite first and second side faces 150, 152 of the back bar 50 are positioned adjacent to the first and second lateral walls 144, 146 of the back bar receptacle segment 132.

The back bar 50 nests in and is concealed by the back bar receptacle 140. Accordingly, the back bar receptacle segment 132 and back bar 50 provide an essentially smooth even transition from the driver seat segment 12 to the passenger seat segment 134. The support arm 138 similarly nests in and is concealed by the support arm receptacle 148. As such, the driver seat segment 12, backrest receptacle segment 132, passenger seat segment 134, and backrest assembly 136 appear to the observer as a single integrated structure. The driver seating surface 20, the exposed rear face 78 of the back bar 50, the top surface 142 of the back bar receptacle segment 132, the exposed rear face 154 of the support arm 138 and the passenger seating surface 36 likewise appear to the observer as an essentially single continuous smooth even surface.

While the forgoing preferred embodiments of the invention have been described and shown, it is understood that alternatives and modifications, such as those suggested and others, may be made thereto and fall within the scope of the invention.

I claim:

1. A motorcycle seating unit comprising:
   a seat including a seating surface having an essentially horizontal orientation, a rear side, and a front side having a height, wherein said seat is attachable to a contoured motorcycle chassis and is configured to conform to contours of the motorcycle chassis; and
   a backrest assembly, including a support arm having a pivot end and a free end, and a back bar having an external surface, wherein said pivot end rotatably engages said seat proximal said rear side and distal said front side, said free end engages said back bar, said backrest assembly has a first selective operational position characterized by an essentially vertical orientation, and said backrest assembly has a second selective operational position characterized by an essentially horizontal orientation with said back bar positioned adjacent said seating surface and adjoining said height of said front side of said seat such that said external surface of said back bar is essentially even with said height of said front side to expose an essentially smooth continuous transition between said back bar and said seat, and further wherein said external surface of said back bar comprises a front face, a rear face, a top face, and a bottom face, and said bottom face adjoins said height of said front side of said seat distal said pivot end and proximal said free end such that said rear face at a junction of said bottom face is essentially even with said height of said front side.

2. The motorcycle seating unit of claim 1, wherein said support arm is a first support arm, said pivot end is a first pivot end, and said free end is a first free end, said motorcycle seating unit further comprising a second support arm having a second pivot end and a second free end.

3. The motorcycle seating unit of claim 2, wherein said second pivot end rotatably engages said seat.

4. The motorcycle seating unit of claim 3, wherein said seat includes a first lateral side and a second lateral side, said first pivot end rotatably engages said seat at said first lateral side proximal said rear side, and said second pivot end rotatably engages said seat at said second lateral side proximal said rear side.

5. The motorcycle seating unit of claim 1, wherein said seat includes a first lateral side and a second lateral side and said pivot end rotatably engages said seat at said first or second lateral side proximal said rear side.

6. The motorcycle seating unit of claim 1, wherein said free end rotatably engages said back bar.

7. The motorcycle seating unit of claim 1, wherein said essentially vertical orientation of said backrest assembly has an angle of recline in a range from about 0° to 45° beyond true vertical.

8. A motorcycle seating unit comprising:
a seat including a seating surface having an essentially horizontal orientation, a rear side, and a front side having a height, wherein said seat is attachable to a contoured motorcycle chassis and is configured to conform to contours of the motorcycle chassis; and
a backrest assembly, including a support arm having a pivot end and a free end, and a back bar having an external surface, wherein said pivot end rotatably engages said seat proximal said rear side and distal said front side, said free end engages said back bar, said backrest assembly has a first selective operational position characterized by an essentially vertical orientation, and said backrest assembly has a second selective operational position characterized by an essentially horizontal orientation with said back bar positioned adjacent said seating surface and adjoining said height of said front side of said seat distal said pivot end and proximal said free end such that said external surface of said back bar is essentially even with said height of said front side to expose an essentially smooth continuous transition between said back bar and said seat and, further wherein said essentially horizontal orientation of said seating surface has an arc to facilitate mounting said seat on an arcuate mounting surface.

9. A motorcycle seating unit comprising:
a seat including a seating surface having an essentially horizontal orientation, a rear side, and a front side having a height, a rear side opposite said front side, a first lateral side, and a second lateral side opposite said first lateral side, wherein said seat is attachable to a contoured motorcycle chassis and is configured to conform to contours of the motorcycle chassis; and
a backrest assembly, including a first lateral support arm having a first pivot end and a first free end, a second lateral support arm having a second pivot end and a second free end, and a back bar, wherein said first pivot end rotatably engages said seat proximal said rear side and distal said front side, said first free end engages said back bar, said second pivot end rotatably engages said seat proximal said rear side and distal said front side, said second free end engages said back bar, said backrest assembly has a first selective operational position characterized by an essentially vertical orientation, and said backrest assembly has a second selective operational position characterized by an essentially horizontal orientation with said first lateral support arm positioned adjacent said first lateral side and said second lateral support arm positioned adjacent said second lateral side, further wherein said back bar has an external surface comprising a front face, a rear face, a top face, and a bottom face, and said bottom face adjoins said height of said front side of said seat distal said pivot end and proximal said free end such that said rear face at a junction of said bottom face is essentially even with said height of said front side.

10. The motorcycle seating unit of claim 9, wherein said back bar has a first end and a second end, said first free end of said backrest assembly rotatably engages said first end of said back bar, and said second free end of said backrest assembly rotatably engages said second end of said back bar.

11. The motorcycle seating unit of claim 9, wherein said first pivot end rotatably engages said seat at said first lateral side and said second pivot end rotatably engages said seat at said second lateral side.

12. The motorcycle seating unit of claim 9, wherein said first pivot end rotatably engages said seat at said first lateral side proximal said rear side and said second pivot end rotatably engages said seat at said second lateral side proximal said rear side.

13. A tandem seat for a motorcycle comprising:
a driver seat segment including a driver seating surface having an essentially horizontal orientation and a rear edge having a height;
a passenger seat segment including a passenger seating surface having an essentially horizontal orientation and a front side having a height; and
a backrest assembly, including a support arm having a pivot end and a free end, and a back bar having an external surface, wherein said pivot end rotatably engages said passenger seat segment, said free end engages said back bar, said backrest assembly has a first selective operational position characterized by an essentially vertical orientation, and said backrest assembly has a second selective operational position characterized by an essentially horizontal orientation with said back bar positioned adjacent said driver seating surface and said passenger seating surface and said back bar adjoining said height of said rear edge of said driver seat segment and said height of said front side of said passenger seat segment such that said external surface of said back bar is essentially even with said height of said rear edge and said height of said front side to expose an essentially smooth continuous transition between said driver seat segment and said passenger seat segment.

14. The tandem seat of claim 13, wherein said essentially horizontal orientation of said passenger seating surface has an arc to facilitate mounting said passenger seat segment on an arcuate mounting surface.

15. The tandem seat of claim 13, wherein said external surface of said back bar comprises a front face, a rear face, a top face, and a bottom face, further wherein said bottom face adjoins said height of said front side of said passenger seat segment such that said rear face at a junction of said bottom face is essentially even with said height of said front side and said top face adjoins said height of said rear edge of said driver seat segment such that said rear face at a junction of said top face is essentially even with said height of said rear edge.

16. The tandem seat of claim 13, wherein said support arm is a first support arm, said pivot end is a first pivot end, and said free end is a first free end, said tandem seat further comprising a second support arm having a second pivot end and a second free end, wherein said second pivot end rotatably engages said passenger seat segment.

17. The tandem seat of claim 16, wherein said passenger seat segment includes a first lateral side and a second lateral side, said first pivot end rotatably engages said passenger seat segment at said first lateral side, and said second pivot end rotatably engages said passenger seat segment at said second lateral side.

18. The tandem seat of claim 13, wherein said essentially vertical orientation of said backrest assembly has an angle of recline in a range from about 0° to 45° beyond true vertical.

19. A motorcycle seating unit comprising:
  a seat having an essentially horizontal orientation, a front side, a rear side, a first lateral side, and a second lateral side, wherein said seat is attachable to a contoured motorcycle chassis and is configured to conform to contours of the motorcycle chassis; and
  a backrest assembly, including a back bar and a support arm having a pivot end and a free end distanced from said pivot end by a length of said support arm, wherein said free end engages said back bar and said pivot end extends away from said back bar and rotatably engages said seat, said backrest assembly having a first selective operational position characterized by an essentially vertical orientation and a second selective operational position characterized by an essentially horizontal orientation, further wherein said backrest assembly is transitionable from said first selective operational position to said second selective operational position by rotating said support arm about said pivot end in a first direction until said back bar attains an adjacent position adjacent said front side and distal said rear side of said seat and at least a portion of said length of said support arm is positioned adjacent said first or second lateral side, and wherein said backrest assembly is transitionable from said second selective operational position to said first selective operational position by rotating said support arm about said pivot end in a second direction until said back bar attains an overhead position overhead said seat more distal said front side and more proximal said rear side of said seat than said adjacent position and said portion of said length of said support arm is overhead said seat more distal said first or second lateral side.

20. The motorcycle seating unit of claim 19, wherein said support arm is a first support arm, said pivot end is a first pivot end, said free end is a first free end distanced from said first pivot end by a length of said first support arm, and said backrest assembly has a second support arm having a second pivot end and a second free end distanced from said second pivot end by a length of said second support arm, said second free end engaging said back bar and said second pivot end extending away from said back bar and rotatably engaging said seat, further wherein said backrest assembly is transitionable from said first selective operational position to said second selective operational position by rotating said first and second support arms about said first and second pivot ends, respectively, in said first direction until at least a portion of said length of said first support arm is positioned adjacent said first lateral side and at least a portion of said length of said second support arm is positioned adjacent said second lateral side and said backrest assembly is transitionable from said second selective operational position to said first selective operational position by rotating said first and second support arms about said first and second pivot ends, respectively, in said second direction to position said portion of said length of said first support arm away from said first lateral side and to position said portion of said length of said second support arm away from said second lateral side.

21. The motorcycle seating unit of claim 19, wherein said seat has a seating surface essentially uncovered by said back bar when said backrest assembly is in said second selective operational position.

* * * * *